(12) United States Patent
Déry

(10) Patent No.: US 8,662,400 B2
(45) Date of Patent: Mar. 4, 2014

(54) OUTSERT WITH VARIABLE DATA

(75) Inventor: Pierre Déry, Ste-Julie (CA)

(73) Assignee: CCL Label, Inc., Framingham, MA (US)

( * ) Notice: Subject to any disclaimer, the term of this patent is extended or adjusted under 35 U.S.C. 154(b) by 0 days.

(21) Appl. No.: 13/527,076

(22) Filed: Jun. 19, 2012

(65) Prior Publication Data

US 2013/0334316 A1  Dec. 19, 2013

(51) Int. Cl.
*G06K 19/02* (2006.01)
(52) U.S. Cl.
USPC ........................................ 235/488
(58) Field of Classification Search
USPC .................................. 235/487–488
See application file for complete search history.

(56) References Cited

U.S. PATENT DOCUMENTS

| | | | |
|---|---|---|---|
| 6,360,462 B1 * | 3/2002 | Mengel | 40/310 |
| 7,247,130 B2 * | 7/2007 | Mattila et al. | 493/421 |
| 8,438,044 B2 * | 5/2013 | Kerrigan et al. | 705/3 |
| 2002/0074386 A1 * | 6/2002 | Sims | 229/92.1 |
| 2003/0118768 A1 * | 6/2003 | Sellars | 428/40.1 |
| 2008/0150275 A1 * | 6/2008 | Raistrick | 283/81 |

FOREIGN PATENT DOCUMENTS

JP          2000351290 A  * 12/2000 ............. B42D 15/02

* cited by examiner

*Primary Examiner* — Christle Marshall
(74) *Attorney, Agent, or Firm* — Warner Norcross & Judd LLP

(57) ABSTRACT

The specification discloses an outsert assembly for pharmaceutical and other containers. The assembly includes an outsert, a tape holding the outsert in a folded configuration, and a machine-readable identifier on the tape. The machine-readable identifier may include e-pedigree information. The outsert may include printed dosage information and relevant medical warnings.

6 Claims, 2 Drawing Sheets

OUTSERT WITH VARIABLE DATA

BACKGROUND OF THE INVENTION

The present invention relates to expanded content labels (ECLs), such as outserts.

Various types of machine-readable codes, such as barcodes and data matrixes, are used to verify the integrity of container contents from manufacturing and filling to the sale to the ultimate consumer. The code is placed on the container so that the container may be tracked through the manufacturing and/or filling process to ensure that the container ultimately contains the proper product. The code also enables the source and lot of the container contents to be determined by subsequent purchasers or handlers of the container.

These codes have become prevalent in the pharmaceutical industry. The e-pedigree standards related to the use of codes on pharmaceutical products has continually become more robust. For example, the container codes may contain information related to the lot number of the product, the expiration date of the product, the potency of the product, the national drug code, the manufacturer, and the distributor.

Currently, container codes typically are included either on the top or the bottom of the container. Unfortunately, both locations present problems in current processing systems. Both the top and the bottom of a container are often nonplanar, so that printing a readable code on the irregular surface is difficult. Further, the equipment required to read codes, especially on the bottoms of the containers, can require an additional processing line extension of at least ten feet in bundling and case packing operations.

In addition to the inclusion of codes on containers, codes can be included on labeling, packaging, and related materials associated with the container. The need continues for reliable, efficient, and cost-effective inclusion of codes on all of these items.

SUMMARY OF THE INVENTION

The described issues are addressed by the present invention as disclosed and claimed in this patent application. Specifically, an ECL includes a machine-readable code. More specifically, the ECL is a folded outsert including a tape or tear strip bearing the machine-readable code. The machine-readable code may be for example a one-dimensional (1D) barcode, a two-dimensional (2D) barcode, a data matrix, a holographic, or a radio frequency identification device (RFID). The e-pedigree information encoded within the machine-readable code may include the lot number, the expiration date, the national drug code, the manufacturer, and/or a unique identifier. In use, the machine-readable code on each outsert tape preferably corresponds to, and/or is identical to, the code on each container. Consequently, the outsert and the container may include matching machine-readable codes.

These and other features and advantages of the invention will be more fully understood and appreciated in view of the following description, drawings, claims, and abstract.

DESCRIPTION OF THE CURRENT EMBODIMENT

An outsert in accordance with a current embodiment of the invention is described and illustrated in this specification and the drawings. The outsert includes a tape or a tear strip bearing a machine-readable code. The method of labeling containers includes (a) applying the machine-readable barcode to the outsert tear strip and (b) adhering the outsert to a pharmaceutical container having a corresponding machine-readable barcode. The code may be one-dimensional (1D) barcode, a two-dimensional (2D) barcode, a data matrix, a holograph, an RFID, or any other machine-readable code or device. The code includes e-pedigree information that may be carried forward to pharmaceutical distributors, retailers and end-users.

Figure 1:
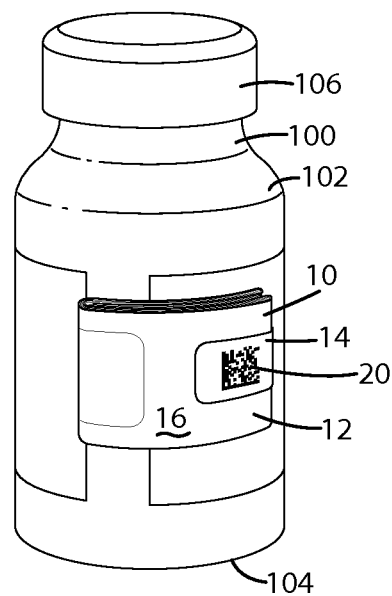
FIG. 1 is a perspective view of an outsert applied to the outside of a pharmaceutical container.
Figure 2:
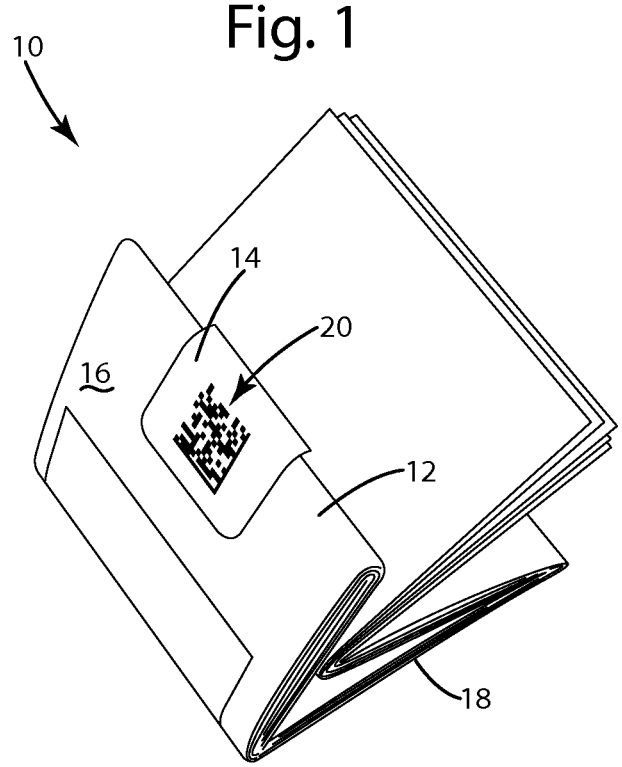
FIG. 2 is a perspective view of the outsert of FIG. 1 removed from the pharmaceutical container and partially opened.

With reference to FIG. 1, an outsert constructed in accordance with a first embodiment of the invention is illustrated and generally designated 10. The outsert 10 includes a folded outsert 12 and a tamper evident tape or tear strip 14 across upper and lower surfaces 16, 18 of the folded outsert 12. The outsert 10 further includes a machine-readable barcode 20 on either or both of the folded outsert 12 and the tamper evident tape 14. In the illustrated embodiment, the machine-readable barcode 20 is printed on both end portions of transparent tamper evident tape 14.

The outsert 12 can be formed according to known techniques, and accordingly will not be described in detail. In the illustrated embodiment, the outsert 12 is formed by folding a sheet of stock paper along a plurality of vertical folds, and subsequently folding the folded article along a plurality of horizontal folds. More particularly, the disclosed outsert 12 begins as a sheet having a length of 25 cm and a width of 22 cm. The outsert 12 is formed with six vertical folds and seven horizontal folds to achieve a reduced size of 3.0 cm×3.0 cm×0.5 cm. The outsert 12 is formed from an integral sheet of stock paper, while in other embodiments the outsert 12 is formed from web stock that is cut into individual sheets of desired dimensions.

A pressure sensitive adhesive on the lower surface 18 of the outsert 12 releasably may secure the outsert 10 to a pharmaceutical container 100. As shown in FIG. 1, the outsert 10 may be releasably secured to a container sidewall 102, while in other embodiments the outsert 10 may be releasably secured to other portions of the container 100, including the base 104 or the removable cap 106. The outsert 10 includes printed information (e.g., information in a human-readable format) including for example dosage information and relevant medical warnings. This information is generally pre-printed on the stock paper or web stock prior to becoming an outsert 12. In addition, this information can be printed on the outsert 12 in multiple languages where desired. The outsert 10 can additionally incorporate tamper evident devices and holograms for added security, and can be resealable for repeated reference.

The barcode 20 can include any machine-readable format, including one-dimensional and two-dimensional formats. One-dimensional formats include for example Universal Product Code (UPC) and Reduced Space Symbology (RSS). Two-dimensional formats, or machine-readable matrices, include for example Quick Response Code and Data Matrix. Other formats can also be utilized, whether now known or hereinafter developed. The barcode 20 includes unencrypted e-pedigree information in the desired format. The e-pedigree information can include, for example, lot, potency, expiration, national drug code, electronic product code, manufacturer, distributor, wholesaler, pharmacy and/or a unique identifier of the salable unit.

Figure 3:
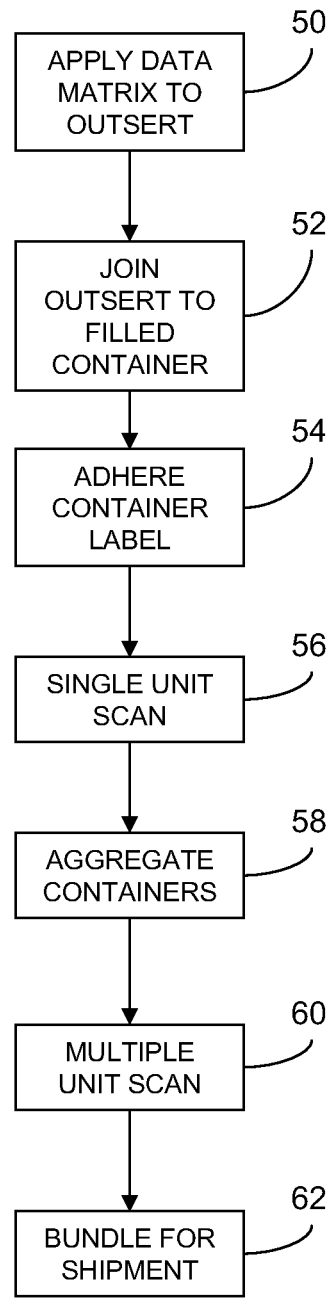
FIG. 3 is a block diagram summarizing a method for labeling containers with the outsert of FIGS. 1-2.

A method for labeling pharmaceutical containers 100 with the outsert 10 is illustrated in FIG. 3. The method includes applying a machine-readable matrix 20, for example a data matrix, to the pre-printed and pre-folded outserts 10 at step 50. This applying step includes printing the data matrix 20 on the tamper evident tape 14. The outserts 10 may be applied to an outer surface of each container 100 by a first label applicator at step 52 according to known methods. This can include a curved sidewall 102 as shown in FIG. 1, or a cap 106.

At step 54, conventional single- or multi-ply labels 22 may be affixed to the containers 100 by a second label applicator according to known roll-to-roll processing techniques. These labels may be printed with a barcode having a unique identifier that matches the unique identifier in the data matrix 20. At step 56, and before aggregating the individual salable containers, a first scanning station verifies the identity of each outsert 10 using the machine-readable matrix printed thereon. At step 58, the containers are aggregated. And at step 60, a second scanning station verifies the identity of the outserts by row or column.

If either of the first or second scanning stations identifies discrepancies in the e-pedigree information, the affected container or containers 100 can be removed from the production line for manual inspection. After the containers 100 have been labeled, scanned and checked at the first and second scanning stations, the aggregated containers 100 are moved to a bundling station for warehousing or shipment at step 62. That is, the aggregated containers 100 may be assembled into multiple unit packages for warehousing or shipment. The multiple unit packages 108 can then be labeled to coincide with the shipping container contents.

The timing for applying the machine-readable matrix 20 to the outserts 10 may vary. For example, the machine-readable matrix 20 can be printed on the tape 14 and adhered to the outserts 10 as soon as the e-pedigree information becomes known. Also by example, the machine-readable matrix 20 can be printed on the tape 14 before application of the outsert 10 to the container at step 52, even if the e-pedigree information is previously known. In either instance, the outserts 10 can be folded and stored for use when needed by the first label applicator at step 52. As noted above, the outserts 10 generally include dosage information and any relevant medical warnings. The e-pedigree information can also be applied to the outsert 10 in human readable format. For example, e-pedigree information can be printed to the outsert 10 contemporaneously with the data matrix at step 50.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents. For example the current embodiments relate to pharmaceutical ECLs, but the present invention is not limited to pharmaceuticals. Any reference to an element in the singular, for example, using the articles "a," "an," "the," or "said," is not to be construed as limiting the element to the singular. Conversely, any reference to elements in the plural is not to be construed as limiting the elements to the plural.

The invention claimed is:

1. A method of labeling pharmaceutical containers comprising the steps of:
   applying a machine-readable identifier to a tape;
   providing a folded outsert having upper and lower surfaces;
   after the first applying step and the providing step, applying the tape to the outsert across the upper and lower surfaces of the outsert; and
   after the second applying step, adhering the lower surface of the outsert to a pharmaceutical container.

2. The method of claim 1 wherein the machine-readable identifier comprises at least one of a barcode, a data matrix, a holograph, and an RFID.

3. The method of claim 1 wherein the machine-readable identifier comprises a barcode.

4. The method of claim 1 wherein the machine-readable identifier comprises a data matrix.

5. The method of claim 1 wherein the machine-readable identifier comprises a holograph.

6. The method of claim 1 wherein the machine-readable identifier comprises an RFID.

\* \* \* \* \*